United States Patent [19]

Meier

[11] Patent Number: 5,294,931

[45] Date of Patent: Mar. 15, 1994

[54] METHOD OF INTERROGATING A PLURALITY OF TRANSPONDERS ARRANGED IN THE TRANSMISSION RANGE OF AN INTERROGATING DEVICE AND TRANSPONDERS FOR USE IN THE SAID METHOD

[75] Inventor: Herbert Meier, Moosburg, Fed. Rep. of Germany

[73] Assignee: Texas Instruments Deutschland GmbH, Freising, Fed. Rep. of Germany

[21] Appl. No.: 875,518

[22] Filed: Apr. 29, 1992

[51] Int. Cl.⁵ .............................................. G01S 13/80
[52] U.S. Cl. ...................................... 342/44; 342/51
[58] Field of Search ................................ 342/44, 51

[56] References Cited

U.S. PATENT DOCUMENTS

| | | | |
|---|---|---|---|
| 3,745,569 | 7/1973 | Works et al. | 342/44 |
| 3,816,709 | 6/1974 | Walton | 342/44 X |
| 3,914,762 | 10/1975 | Klensch | 342/44 |
| 4,068,232 | 1/1978 | Meyers et al. | 342/44 |
| 4,123,754 | 10/1978 | Armstrong | 342/44 |
| 4,213,129 | 7/1980 | Kennedy et al. | 342/51 |
| 4,345,253 | 8/1982 | Hoover | 342/44 |
| 4,350,982 | 9/1982 | Alpers | 342/42 |
| 4,724,427 | 2/1988 | Carroll | 342/44 X |
| 4,911,217 | 3/1990 | Dunn et al. | 342/44 X |
| 5,053,774 | 10/1991 | Schuermann et al. | 342/44 |
| 5,073,781 | 12/1991 | Stickelbrocks | 342/51 |
| 5,126,745 | 6/1992 | Steinhagen et al. | 342/51 |
| 5,144,314 | 9/1992 | Malmberg et al. | 342/44 |
| 5,164,732 | 11/1992 | Brockelsby et al. | 342/44 |

*Primary Examiner*—John B. Sotomayor
*Attorney, Agent, or Firm*—Rebecca A. Mapstone; James C. Kesterson; Richard L. Donaldson

[57] ABSTRACT

A single interrogation device interrogates a plurality of transponders arranged within the range of transmission of the interrogation device and identifies them without any mutual interference.

The interference free operation is obtained by the interrogation device sequentially transmitting a plurality of RF interrogation pulses, separated from each other in time and whose energy changes from one pulse to the next one, to transponders which have an energy storage element and which respond to the interrogation pulses with an answer signal in dependence upon the condition that, at the end of each interrogation pulse, the charge voltage present at the energy storage element falls within a predetermined voltage range.

4 Claims, 5 Drawing Sheets

METHOD OF INTERROGATING A PLURALITY OF TRANSPONDERS ARRANGED IN THE TRANSMISSION RANGE OF AN INTERROGATING DEVICE AND TRANSPONDERS FOR USE IN THE SAID METHOD

FIELD OF THE INVENTION

The invention relates to a method for the interrogation of a plurality of batteryless transponders arranged in the transmission range of an interrogation device. Furthermore the invention relates to a transponder for use in such a method.

BACKGROUND OF THE INVENTION

A transponder system is described, in which with the aid of an interrogation device batteryless transponders may be caused to transmit an answer signal, which may contain encoded information as regards the identity of the respectively reacting transponder and possibly further information as well. The particular feature of the transponder utilized is that it does not comprise any batteries to supply its operating power. The operating voltage which the transponder requires in order to transmit its response signal is obtained from a RF pulse interrogation which is transmitted by the interrogation device of the transponder system. In the transponder this RF interrogation pulse is rectified and the voltage then produced is utilized for charging a capacitor constituting an energy storing means. As soon as circuit unit in the transponder detects the end of this RF interrogation pulse and sufficient energy has been stored in the energy storing element, the transponder transmits the above noted answer signal. This answer signal may then be received and processed by the interrogation device.

Such transponders of the type described may, for instance be implanted in animals or by arranged on articles so that with the aid of the interrogation device, the animals or the articles may be identified on the basis of the encoded information in the answer signals.

One problem in conjunction with such a transponder system occurs if a plurality of transponders are present in the transmission range of the interrogation device. Such transponders then namely simultaneously receive one transmitted RF interrogation pulse and will then also transmit their answer signal back at the same time as well, if after the end of the RF interrogation pulse there is sufficient energy stored in their energy storing means. The simultaneously produced answer signals render unambiguous identification of the respective transponder by the interrogation device impossible.

In addition, if instead of the interrogator transmitting one high power interrogation pulse, which would provide at least the furthest transponder with enough energy to respond, the interrogator transmitted a successive series of low power to high power pulses, wherein the low power pulse would be enough energy to charge-up the closest transponder and the high power pulse would be enough energy to charge-up the furthest transponder, transponders will still simultaneously respond. To illustrate an example, assume that the transponder has a discharge function such that if the transponder does not receive adequate power to transmit an entire response telegram upon the termination of the interrogation pulse, the transponder discharges. Then, when the interrogator transmits a minimum power pulse, only the closest transponder is adequately charged with enough energy to respond, so there is no interference from other transponders trying to respond simultaneously. However, when the interrogator transmits a higher power interrogation pulse, not only are the further transponders charged-up adequately to respond, but the closer transponders are also charged up adequately to respond, thereby causing interference in the reception of either answer signal.

SUMMARY OF THE INVENTION

One object of the present invention is to provide a method of the type initially mentioned such that with the aid of one interrogation device it is also possible to interrogate a plurality of transponders arranged within the range of transmission and to identify them without any mutual interference.

In accordance with the invention, this object is to be attained by the interrogation device sequentially transmitting a plurality of RF interrogation pulses, separated from each other in time and whose energy changes from one pulse to the next one, to transponders which have an energy storage element and which respond to the interrogation pulses with an answer signal in dependence upon the condition that, at the end of each interrogation pulse, the charge voltage present at the energy storage element falls within a predetermined voltage range.

On using the method in accordance with the invention, the RF interrogation device transmits a series of various power level RF interrogation pulses. Several transponders, for example Transponders 1, 2, and 3 are located within the transmission range of the interrogator, wherein Transponder 1 is located closer to the interrogator than Transponder 2, and Transponder 3 is located further from the interrogator than Transponders 1 or 2. In order to transmit an answer signal in response to the interrogation signal, each of the Transponders require the charge voltage present at the energy storage element to fall within the same predetermined voltage level range. However, because they are located at different distances from the interrogator, Transponders 1, 2 and 3 each receive varying amounts of energy from any of the transmitted interrogation pulses. Therefore, only the transponder which receives an amount of interrogation signal energy, present at the energy storage element, that falls within a predetermined voltage range, transmits an answer signal. For example, the interrogator transmits an interrogation pulse and at the end of the interrogation pulse, the charge voltage present at the energy storage element of Transponder 2 falls within the predetermined voltage level range, thereby enabling the transmission of an answer signal from Transponder 2. Transponder 1, however, receives much more energy from the same interrogation signal, therefore, the charge voltage present at the energy storage element of Transponder 1 does not fall within the predetermined voltage range, thus Transponder 1 does not transmit the answer signal. Likewise, Transponder 3 receives less energy from the same interrogation pulse than the other transponders because it is located further from the interrogator, and, again, the charge voltage present at the energy storage element does not fall within the predetermined voltage range, thus Transponder 3 does not transmit the answer signal. As a consequence of the use of the method in accordance with the invention, the probability that after the transmission of a respective RF interrogation pulse with a predetermined energy level only one transponder will respond, is considerably increased, more particularly if the predetermined range of the charge voltage, which has to be reached as a condition for the enablement for the return of an answer signal, is made relatively narrow. In fact the narrower range, the greater the probability that the answer return condition is fulfilled for only respectively one of the transponders in the transmission range of the interrogation device.

Further advantageous developments of the invention are recited in the following paragraphs.

A transponder for use in the device of the present invention may be characterized by a window comparator to whose input the charge voltage of the energy storage element is fed and at whose output an enable signal appears, when the charge voltage is within a predetermined range, the enable signal functioning to cause the return of the transponder answer signal.

BRIEF DESCRIPTION OF THE DRAWINGS

The invention will now be described with reference to the figures by way of example.

DETAILED DESCRIPTION OF THE PREFERRED EMBODIMENTS

Figure 1:
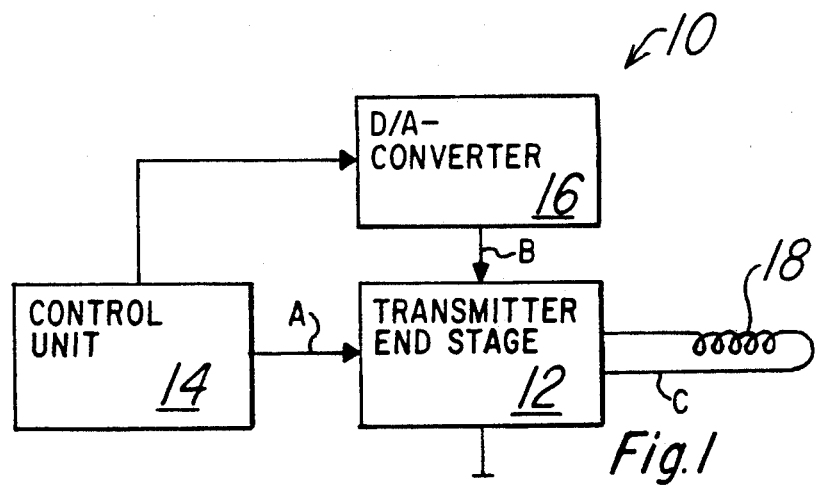
FIG. 1 is a diagrammatic block circuit of an interrogation device which is able to sequentially transmit RF interrogation pulses with an amplitude increasing from one pulse to the next one.

With the aid of the interrogation device, which is diagrammatically illustrated in FIG. 1, it is possible to transmit RF interrogation pulses whose energy increases from one pulse to the next one. The interrogation device comprises a transmitting end stage 12, which may be controlled by a control unit and by means of a D/A converter 16. The control unit 14 provides the D/A converter 16 with progressively increasing digital values, which are converted into analog voltage values by the D/A converter. These voltage values function as a supply or power voltage for the transmitter end stage 12. The control unit 14 furthermore sends enable pulses to the transmitter end stage 12, which are synchronized to time respectively with the digital values sent to the D/A converter 16. This means that every time the D/A converter applies a voltage with a certain values as a power voltage to the transmitter end stage 12, the transmitter end stage is enabled for the transmission of a RF interrogation pulse by means of an antenna 18. The transmitter end stage 12 then provides a RF interrogation pulse, whose amplitude is respectively dependent on the supply voltage supplied at the point in time in question by the D/A converter 16.

Figure 2:
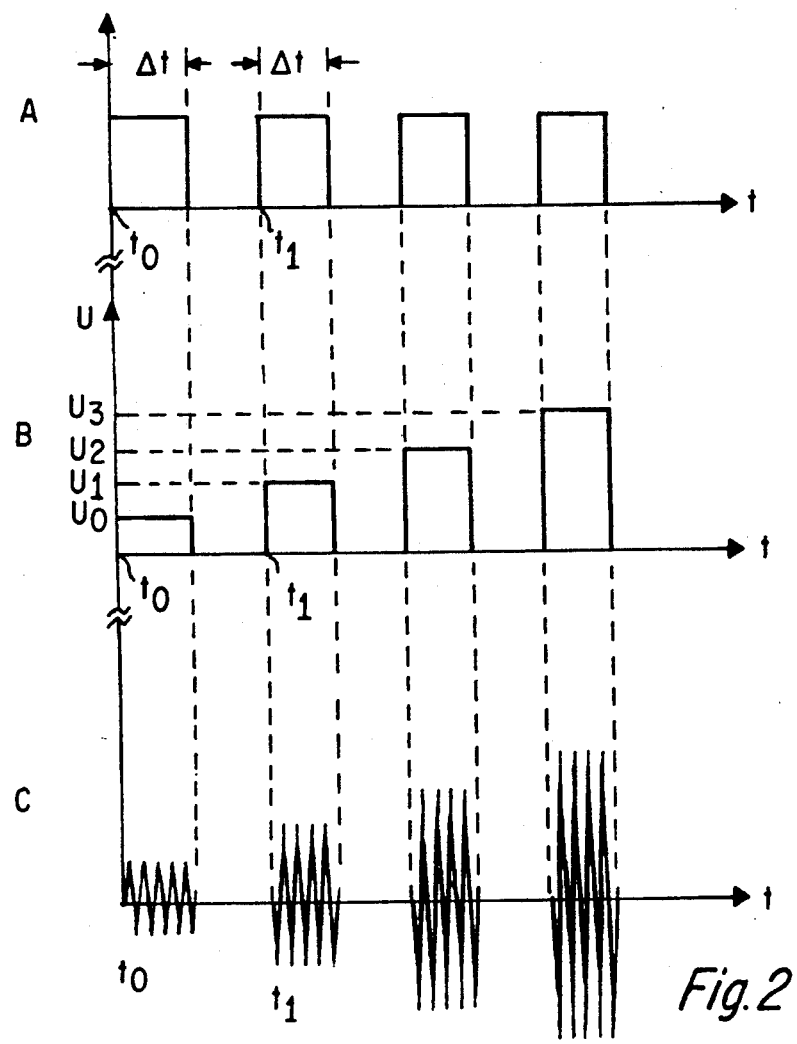
FIG. 2 is a diagram serving to explain the signals occurring at points A, B and C in FIG. 1.

The FIG. 2 shows time graphs of the signals at the points A, B and C of FIG. 1. It will be seen from these figures that the RF interrogation pulses, which are supplied by the transmitter end stage 12 to the antenna 18 and are radiated by the latter, increase in amplitude from one pulse to the next one so that these pulses respectively have a larger energy level. This ever increasing amplitude is achieved because the D/A converter 16 supplies progressively increasing supply voltages $U_0$, $U_1$, $U_2$ and $U_3$ to the transmitter end stage 12. The number of pulses with an increasing energy radiated by the antenna 18 will be dependent on the individual case of application.

In FIG. 1 only those modifications are illustrated which are necessary in this known interrogation device in order to render it possible to radiate pulses with changing energy in the design of FIG. 1 so that the energy increases from one pulse to the next one.

FIG. 2 shows an embodiment of the invention as an interrogation device 20, with the aid of which it is possible to radiate RF interrogation pulses whose duration increases from one pulse to the next one so that the radiated energy as well increases form pulse to pulse as well. The interrogation device 20 comprises a transmitter end stage 22 which is connected with a set supply voltage U equal to $U_v$. With the aid of a control unit 24 it is possible to enable pulses with a progressively increasing duration to be supplied to the transmitter 22 so that accordingly the transmitter end stage 22 as well is supplied with RF interrogation enable pulses with a progressively increasing length and to radiate such pulses with an increasing length via an antenna 26.

Figure 3:
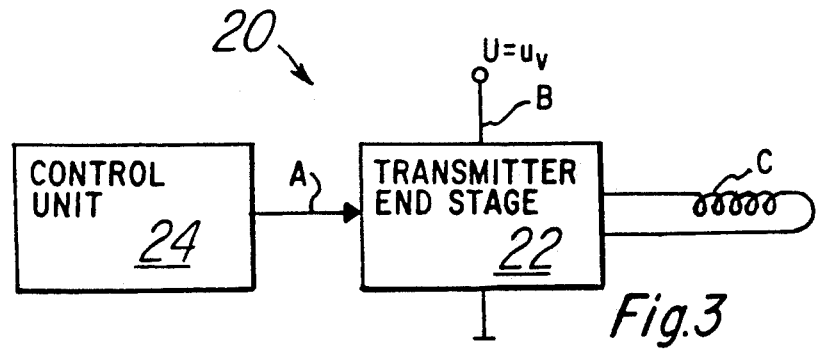
FIG. 3 is a diagrammatic block circuit of an interrogation device which is able to sequentially transmit RF interrogation pulses whose duration increases from one pulse to the next one.
Figure 4:
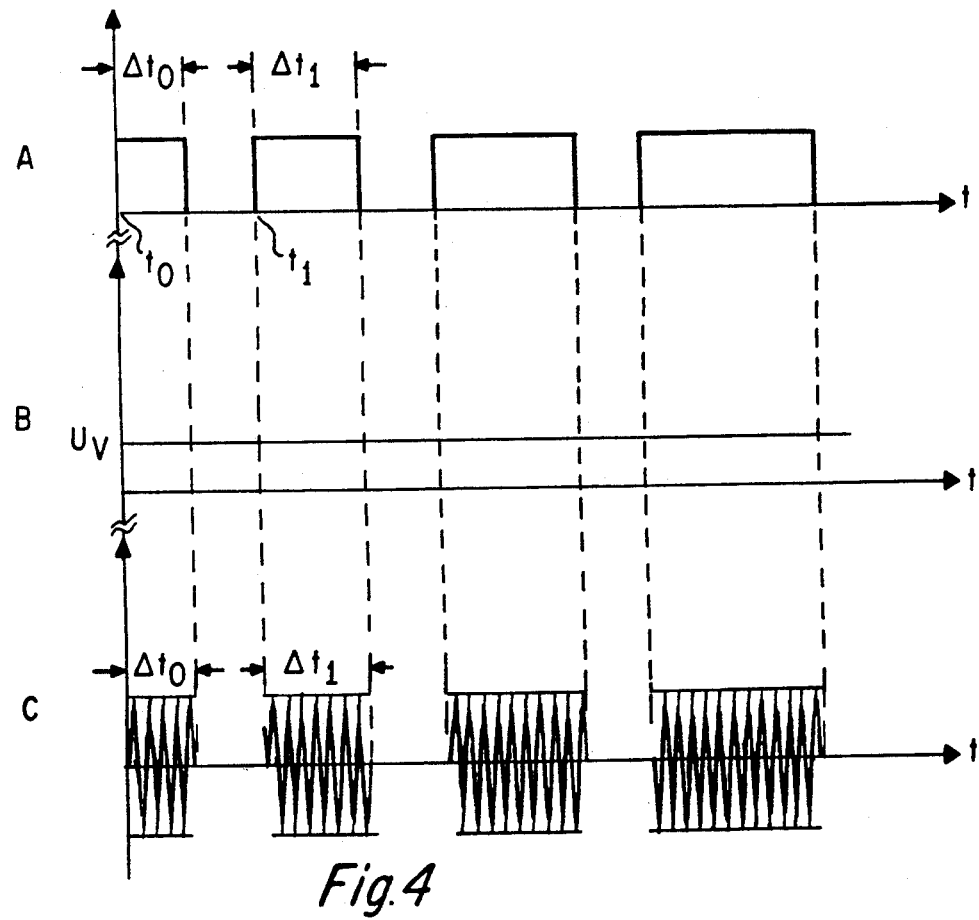
FIG. 4 is a diagram serving to explain the signals occurring at the points A, B and C in FIG. 3.

FIG. 4 contains time graphs of the signal occurring at the circuit points A, B and C of FIG. 3. As will be seen the duration of the enable signals fed to the transmitter end stage 22 by the control unit 24 becomes larger and larger from signal to signal ($\Delta t_0 < \Delta t_1$) so that the antenna 26 as well will radiate signals with an ever increasing duration.

It will now be explained with reference to FIG. 5 how using an interrogation device with the design illustrated in FIG. 1, in a transponder system two transponders 30 and 32 may be interrogated, which are arranged within the range of the interrogation device 10. At the start of an interrogation cycle the control unit 14 supplies a digital signal to the D/A converter, and such signal is converted by the converter 16 into a voltage $U_0$ as a supply voltage for the transmitter end stage 12. Simultaneously the control unit 14 feeds the enable signal to the transmitter end stage, such signal commencing at the point in time $t_0$ and having the duration of $\Delta t$. During this duration the transmitter end stage 12 will produce a first RF interrogation pulse, which is radiated by the antenna.

As stated in the introduction hereof the transponders 30 and 32 are not provided with a power supply in the form of a battery: they derive their driving power form the respectively received RF interrogation pulse. This involves the rectification of this pulse and charging of a capacitor by means of the voltage produced by rectification. The two transponders 30 and 32 simultaneously receive the RF interrogation pulse radiated by the antenna 18 so that in both transponders the charging of the capacitor, functioning as a power source, starts at the point in time $t_0$. Since the transponder 30 is at a shorter distance from the interrogation device 10 than the transponder 32, the transponder 30 receives the RF interrogation pulse with a greater field strength so that accordingly furthermore the voltage produced by rectification has a higher value as well than that in the transponder 32. The consequence of this is that the capacitor utilized as a power source in the transponder 32 charges up to a higher value than that in the transponder 32. In the time graphs of FIG. 5 the capacitor voltages $U_{30}$ and $U_{32}$ are shown and it is to be seen that in the transponder 30 the capacitor voltage will, after the expiry of the pulse duration $\Delta t$, have a voltage value which falls within the predetermined voltage range, for example, between two voltage values $S_1$ and $S_2$, thereby enabling transponder 30 to transmit an answer signal. Owing to the greater distance of the transponder 32 from the interrogation device 10 and the accordingly lower field strength, in the transponder 32, the voltage $U_{32}$ will only reach a value lower than the voltage value $S_1$, which does not fall within the predetermined voltage range of $S_1$ to $S_2$, thereby prohibiting the transmission of the answer signal by transponder 32.

After the end of the time period $\Delta t$ the first RF interrogation pulse ends and after a pause of a predetermined duration under the control of the control unit 14, the transmitter end stage will start transmitting a further RF interrogation pulse whose amplitude is however greater. For a description of the present situation it is assumed that the capacitors in the transponder 30 and 32 are discharged so that the charging thereof by the voltage, which is produced by rectification of the RF interrogation pulse, starts at the voltage value 0 again. The details of the transponder, with which this is rendered possible, will be described later with reference to FIG. 7.

Figure 5:
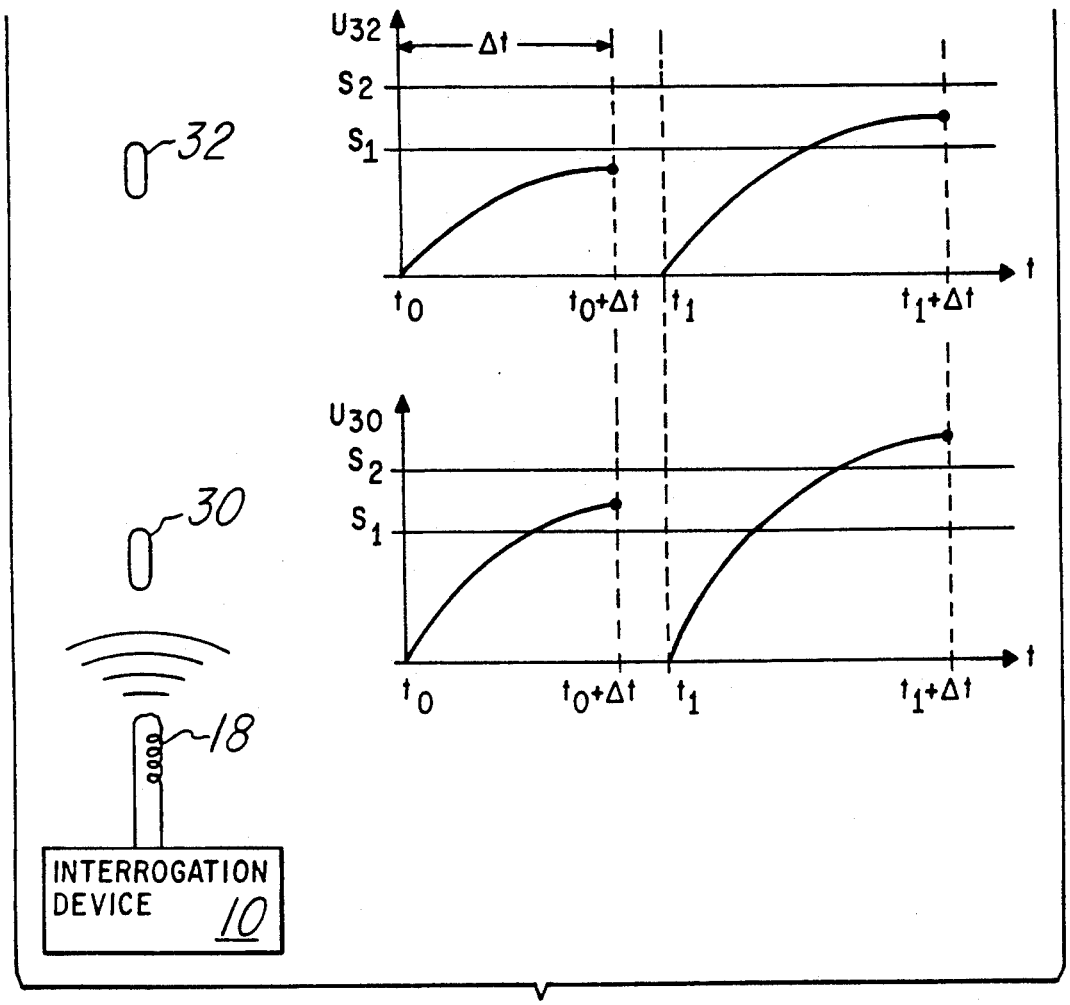
FIG. 5 is a diagrammatic showing of a transponder system with an interrogation device of the type illustrated in FIG. 1 and with two transponders, indicating for each transponder the course of the charge voltage at the energy storage element on receiving two sequentially occurring RF interrogation pulses in a graph in which voltage is plotted against time.

As the graphs of FIG. 5 show, the capacitor utilized in the transponder 30 as the power source is charged up to a significantly higher voltage owing to the greater amplitude of the second RF interrogation pulse, the voltage value, existing at the end of the second RF interrogation pulse, being above the voltage value $S_2$, or outside the predetermined voltage range. In the second transponder 32 however a voltage value is reached, which is between the voltage values $S_1$ and $S_2$, thereby enabling the transmission of an answer signal by transponder 32.

As will be explained below in detail, the fact that the charge voltage present at the end of a RF interrogation pulse at the capacitor in a transponder 30 or 32 falls within the predetermined range of between the voltage values $S_1$ and $S_2$, is utilized for the interrogation of individual transponders, even if a plurality of transponders are simultaneously located within transmission range of the respective interrogation device.

Figure 6:
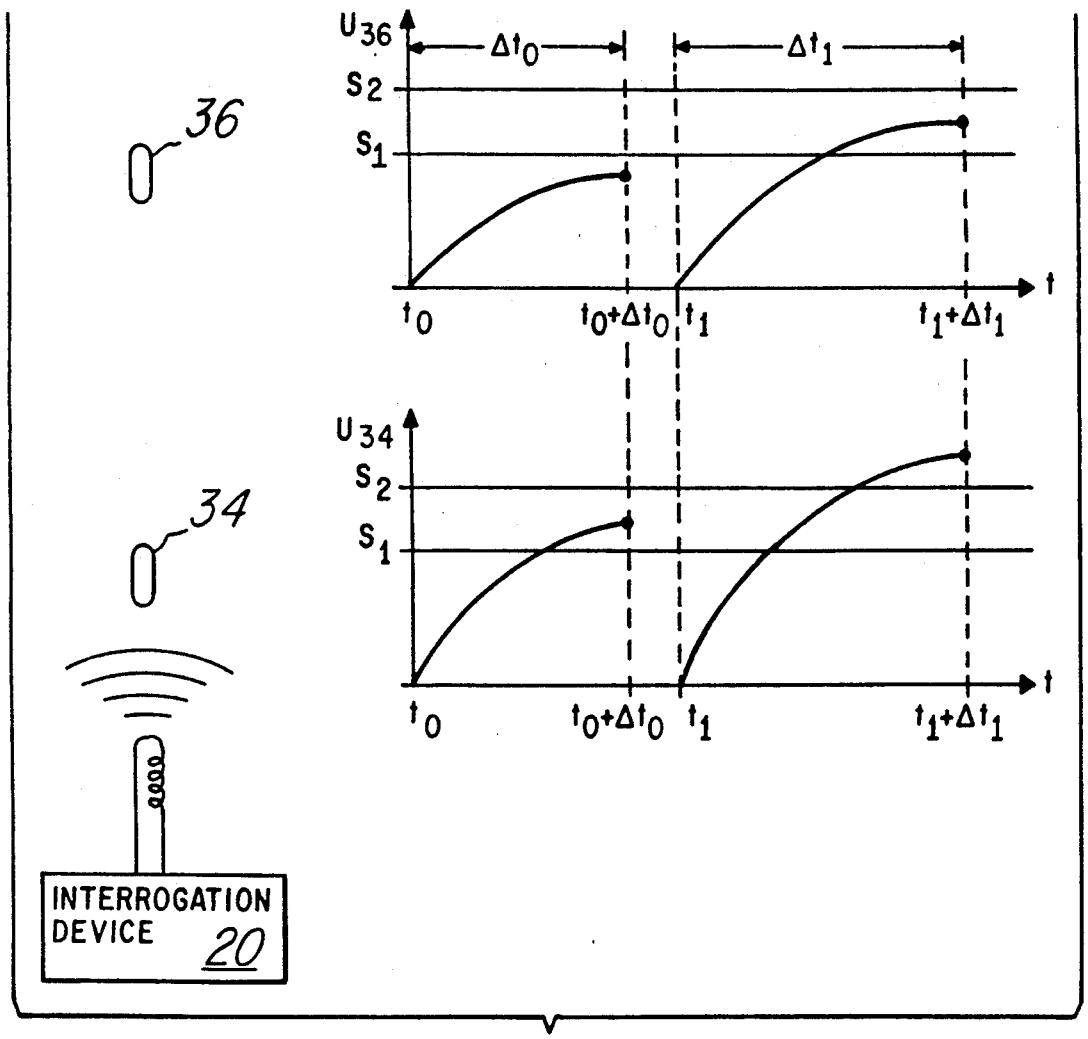
FIG. 6 is a similar showing to that of FIG. 5 but however with an interrogation device of the type illustrated in FIG. 3.

With reference to FIG. 6 it is to be noted that in the case of the use of an interrogation device of the type illustrated in FIG. 3, it is possible for two transponders to be interrogated which are in the transmission range of the interrogation device. The interrogation device 20 begins at the point $t_0$ in time to transmit a first RF interrogation pulse, which has a predetermined duration $\Delta t_0$. This RF interrogation pulse is received by both transponders 34 and 36. Since the transponder 34 is at a shorter distance from the interrogation device 20 than the transponder 36, the greater field strength at the position of the transponder 34 will lead to a greater charge of the capacitor utilized as the power source so that accordingly, as illustrated in graphs of FIG. 6, at the end of the first RF interrogation pulse, that is to say after the time $t_0 + \Delta t_0$, a charge voltage will be reached which falls within the predetermined range of between the voltage values $S_1$ and $S_2$, thereby enabling the transmission of the answer signal from transponder 34. However, on the other hand, owing to the lower field strength in the transponder 36, the voltage $U_{36}$ will only reach a value lower than the voltage value $S_1$, which does not fall within the predetermined voltage range of $S_1$ to $S_2$, thereby prohibiting the transmission of the answer signal by transponder 36. The second RF interrogation pulse transmitted after a predetermined pause by the interrogation device 20, has longer duration $\Delta t_1$ so that accordingly more energy will be fed to the transponders 34 and 36. At the end of the second RF interrogation pulse, the charge voltage of the energy storage element of transponder 34 will reach a value above the voltage value $S_2$, which is outside the predetermined range of between the voltage values of $S_1$ and $S_2$, and which prohibits transmission of an answer signal by transponder 34. While, on the other hand, the charge voltage in the transponder 36 will reach a value which falls within the predetermined range of between the voltage values $S_1$ and $S_2$.

As in the example of FIG. 5, it is possible to use this fact for the interrogation of the two transponders 34 and 36 which are arranged within transmission range of the interrogation device 20.

Figure 7:
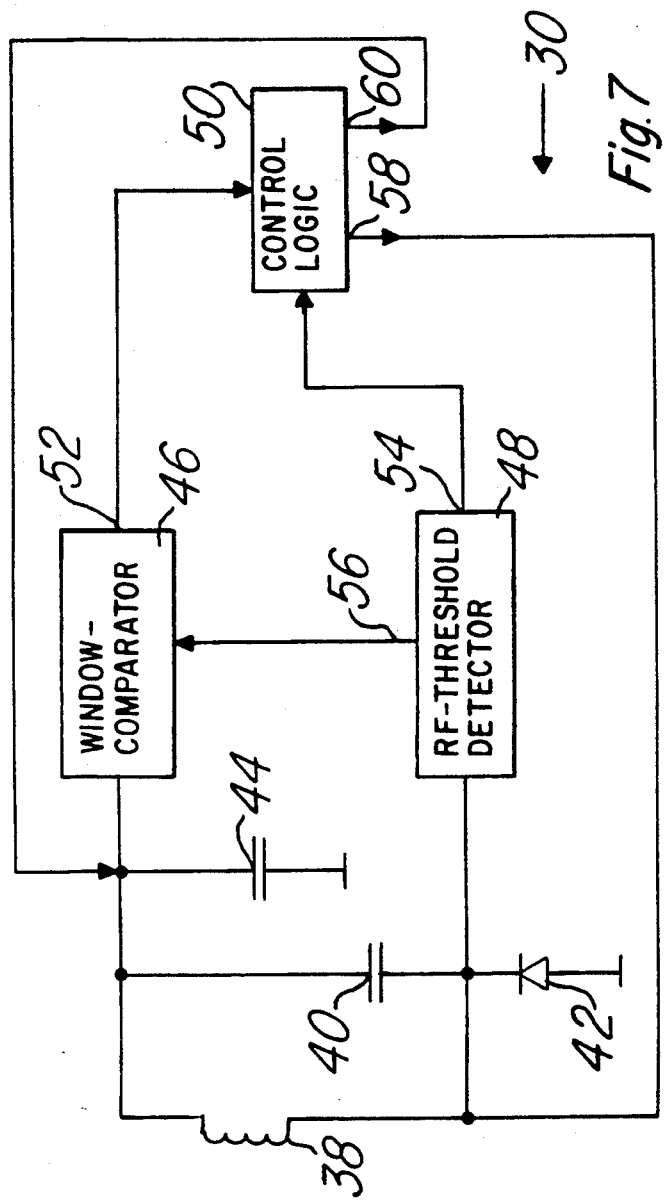
FIG. 7 is a diagrammatic block circuit of a transponder for use in the method in accordance with the invention.

The main features of the transponder design are illustrated in FIG. 7, the circuit diagram of FIG. 7 showing the features of the circuitry, with the aid of which processing of the charge voltages occurring at the capacitor functioning as a power source is rendered possible.

The transponder 30 of FIG. 7 comprises an antenna 38, with which the RF interrogation pulses may be received. Together with a capacitor 40 this antenna 38 constitutes an oscillating circuit, which is tuned to the frequency of the RF interrogation pulses. By means of a diode 42 the respectively received RF interrogation pulse is rectified and the rectified voltage causes the charging of a capacitor 44, whose charge voltage constitutes the supply voltage of the transponder 30. By means of a window comparator 46 it is possible to respectively ascertain whether or not the charge voltage at the capacitor 44 has a value which is between the two threshold values $S_1$ and $S_2$, which are referred to in the FIG. 5 and 6. The transponder 30 comprises furthermore a RF threshold detector 48, which has the function of ascertaining whether the amplitude of the RF oscillation at the oscillating circuit consisting of the antenna 38 and the capacitor 40 has gone below a predetermined threshold. Dropping below this value in fact signifies the end of a received RF interrogation pulse.

The transponder 30 furthermore comprises a control logic system 50, which in a way dependent on the signals from the window comparator 46 and the RF threshold value detector 48 initiates the different various control operations in the transponder 30.

The transponder 30 operates as follows on receiving a RF interrogation pulse:

On the reception of a RF interrogation pulse the oscillating circuit constituted by the antenna 38 and the capacitor 40 is caused to start oscillating its resonant frequency corresponding to the frequency of the RF interrogation pulse. The direct voltage produced by rectification using the diode 42 causes charging of the capacitor 44. After the end of the RF interrogation pulse the oscillation in the said resonant circuit also dies down and the RF threshold detector 48 sends a signal to the control logic system 50 via its output 54, when the Rf oscillation has sunk below predetermined threshold value. Simultaneously the RF threshold detector 48 sends a signal to the window comparator via its output 56, such signal causing the window comparator 46 to check the charge voltage at the capacitor 44 to see if it has a value between the threshold values $S_1$ and $S_2$. If this is the case, the window comparator 46 will feed a signal to the control logic system indicating the fulfillment of this condition. The control logic then produces an information signal at its output 58 containing a code group representing the identity of the transponder 30, such information signal being transmitted via the antenna 38 so that it may be received by the interrogation device.

After the end of the information signal the control logic system 50 will provide a further signal at its output 60, such signal functioning to discharge the capacitor 44.

If on the other hand the window comparator 46 ascertains that the charge voltage at the capacitor 44 does not, at the end of the RF interrogation pulse, have a value between the threshold values $S_1$ and $S_2$, no signal is sent via the output 52 to the control logic system so that accordingly the transponder 30 does not send any information signal to the interrogation device. In this case as well the control logic system 50 produces a signal at the output 60 to however cause the discharge of the capacitor 44 so that the transponder 30 is again ready to receive further RF interrogation pulse and to commence recharging the capacitor 44 starting at the voltage value 0.

For the window comparator 46 it is possible for instance to use the circuit which is described in the book "Halbleiter-Schaltungstechnik" by Tietze and Schenk, page 182. This circuit comprises two comparator modules having respectively a positive and a negative input. The negative input of the one comparator and the positive input of the other comparator are connected together and receive the unknown input voltage, while the positive input of the one comparator receives the reference voltage constituting the upper threshold value $S_2$ and the negative input of the other comparator receives the reference voltage constituting the lower threshold value $S_1$. The outputs of the two comparators are connected with the inputs of an AND circuit, which provides a signal at the output, when voltage applied to the connected input of the comparators has reached a value between the reference voltages.

In the case of the application of the method in accordance with the invention it is assumed that the transponders arranged within the transmission range of the interrogation device are at different distances form the same. If this applies, at the end of each RF interrogation pulse there will be different charge voltages at the capacitor 44 so that respectively only one transponder responds, in the case of which charge voltage is between the two threshold values $S_1$ and $S_2$. The nearer the two threshold values $S_1$ and $S_2$ are to each other, the greater the certainty that only one of a plurality of transponders will respond, since the probability will decrease that in the case of two transponders the said condition is fulfilled. In the case of a smaller distance between the threshold values $S_1$ and $S_2$ it is naturally also necessary for the differences in energy between sequentially transmitted RF interrogation pulses to be made smaller taking into account the threshold value difference.

The number of RF interrogation pulses sequentially transmitted during an interrogation cycle will be dependent on the number of distance ranges into which the transmission range of the interrogation device is divided. In the embodiments of the invention illustrated in FIGS. 1, 2 and 3, 4 operation is with respectively four RF interrogation pulses, this meaning that four distance ranges are set so that within one interrogation cycle at the most four transponders are able to respond, which are in the respective distance ranges.

In practice the interrogation device operates with a frequency of the Rf interrogation pulses of 134 KHz. In the case of the use of the embodiment of the invention illustrated in FIGS. 2 and 3, that is to say with RF interrogation pulse, whose duration increases from one pulse to the next one, the pulse duration was incremented in steps of 1 ms. It was possible to show that in this method the transponders were able to separately respond providing their distances from the interrogation device only differed by amounts in the order of mm.

I claim:

1. A method for interrogating and identifying a plurality of batteryless transponders arranged in the transmission range of an interrogation device wherein only those transponders which have stored an amount of voltage which falls within their predetermined window respond, comprising the steps of:

transmitting interrogation pulses with intervals of time between them, whose energy changes from pulse to pulse;

receiving said interrogation pulses;

rectifying said received interrogation pulses;

storing said rectified interrogation pulses as a charge voltage at an energy storage element;

detecting the termination of said interrogation pulses;

comparing the amount of charge voltage stored at said energy storage element to a predetermined voltage range, said predetermined voltage range having an upper voltage limit and a lower voltage limit, beyond which said transponder could respond but-for said comparing the amount of charge voltage to said predetermined voltage range;

transmitting an answer signal in response to the termination of said interrogation pulses and in response to said charge voltage falling within said predetermined voltage range.

2. The method as claimed in claim 1, wherein the RF interrogation pulses transmitted with intervals of time between them have the same duration and increase in amplitude from one pulse to the next one.

3. The method as claimed in claim 1, wherein the Rf interrogation pulses transmitted with intervals of time between them have the same amplitude and increase in duration from one pulse to the next one.

4. A transponder for use in a remote identification system wherein there are more than one transponders within the interrogation range of an interrogator wherein the purpose is to have one transponder respond at a time to prevent interference between them comprising:

an antenna for reception of an interrogation signal and transmission of a transponder answer signal;

a rectifier for rectification of said received interrogation signal;

an energy storage element operable to be charged with said rectified interrogation signal in the form of a charge voltage;

a window comparator, to whose input said charge voltage of said energy storage element is applied and at whose output an enable signal is produced in response to said charge voltage falling within a predetermined range, said predetermined range having an upper voltage limit and a lower voltage limit beyond which said transponder could respond but-for said enable signal being produced in response to said charge voltage falling within a predetermined range, the enable signal transmission of the transponder answer signal.

* * * * *